US008522945B2

(12) United States Patent
Pickelman et al.

(10) Patent No.: US 8,522,945 B2
(45) Date of Patent: Sep. 3, 2013

(54) MECHANICAL SLIP FAILSAFE SYSTEM FOR A HEAVY DUTY MULTI-SPEED FAN CLUTCH

(75) Inventors: Dale M. Pickelman, Marshall, MI (US); Theodore A. Malott, Jackson, MI (US)

(73) Assignee: BorgWarner Inc., Auburn Hills, MI (US)

( * ) Notice: Subject to any disclaimer, the term of this patent is extended or adjusted under 35 U.S.C. 154(b) by 738 days.

(21) Appl. No.: 12/519,633

(22) PCT Filed: Dec. 22, 2007

(86) PCT No.: PCT/US2007/088766
§ 371 (c)(1),
(2), (4) Date: Jun. 17, 2009

(87) PCT Pub. No.: WO2008/080159
PCT Pub. Date: Jul. 3, 2008

(65) Prior Publication Data
US 2010/0089717 A1  Apr. 15, 2010

Related U.S. Application Data

(60) Provisional application No. 60/871,685, filed on Dec. 22, 2006.

(51) Int. Cl.
*F16D 43/284* (2006.01)
*F16D 43/25* (2006.01)
*F16D 25/0638* (2006.01)

(52) U.S. Cl.
USPC .................... 192/85.61; 192/103 F; 192/82 T

(58) Field of Classification Search
USPC .................................. 192/82 T, 85.61, 103 F
See application file for complete search history.

(56) References Cited

U.S. PATENT DOCUMENTS

| | | | | |
|---|---|---|---|---|
| 3,804,219 A | * | 4/1974 | Cummings, III | 192/82 T |
| 4,094,393 A | * | 6/1978 | Spokas | 192/82 T |
| 4,189,095 A | * | 2/1980 | Monigold et al. | 192/82 T |
| 4,231,457 A | * | 11/1980 | Cornish | 192/82 T |
| 6,942,083 B2 | * | 9/2005 | Barnes et al. | 192/82 T |
| 7,047,911 B2 | * | 5/2006 | Robb et al. | 192/85.24 |
| 7,178,656 B2 | * | 2/2007 | Pickelman et al. | 192/82 T |
| 7,249,664 B2 | * | 7/2007 | Ignatovich et al. | 192/82 T |

* cited by examiner

*Primary Examiner* — David D Le
*Assistant Examiner* — Jacob S Scott

(57) ABSTRACT

A failsafe system for a heavy-duty multi-speed clutch includes a thermal valve coupled within a clutch pressure tube orifice circuit protecting a clutch pack from heat degradation. When oil temperature of the clutch reaches a level where thermal degradation can occur, the thermal valve allows flow into a clutch piston system at a maximum operating pressure, thereby engaging a clutch drive and cooling the clutch to a safe condition.

7 Claims, 4 Drawing Sheets

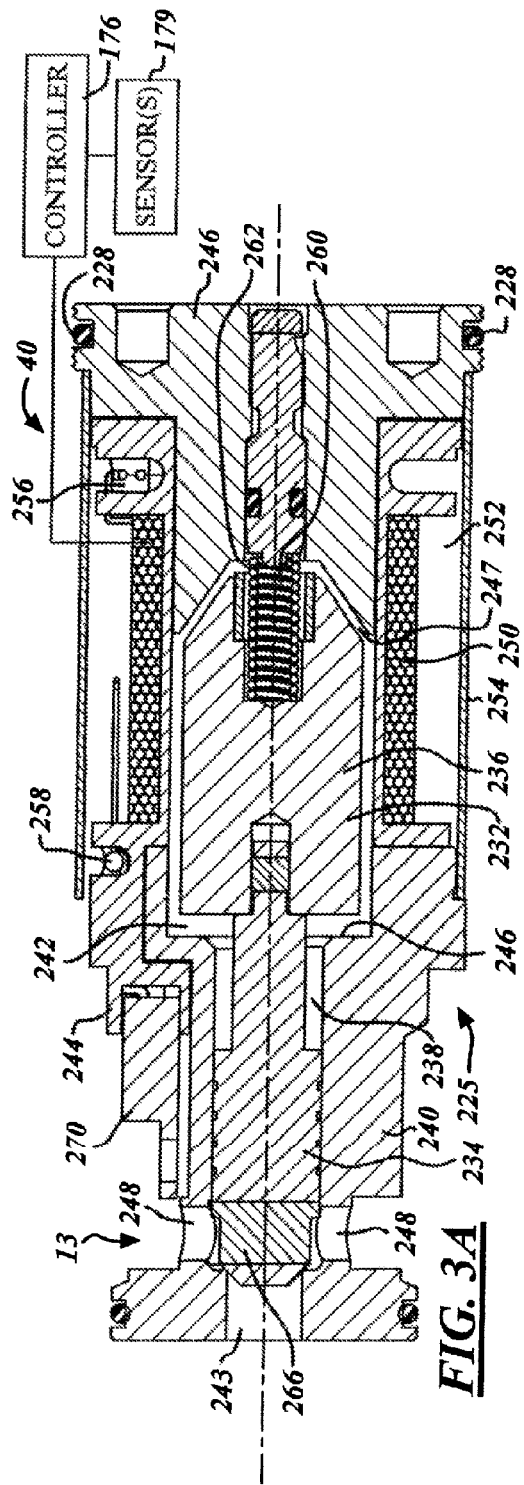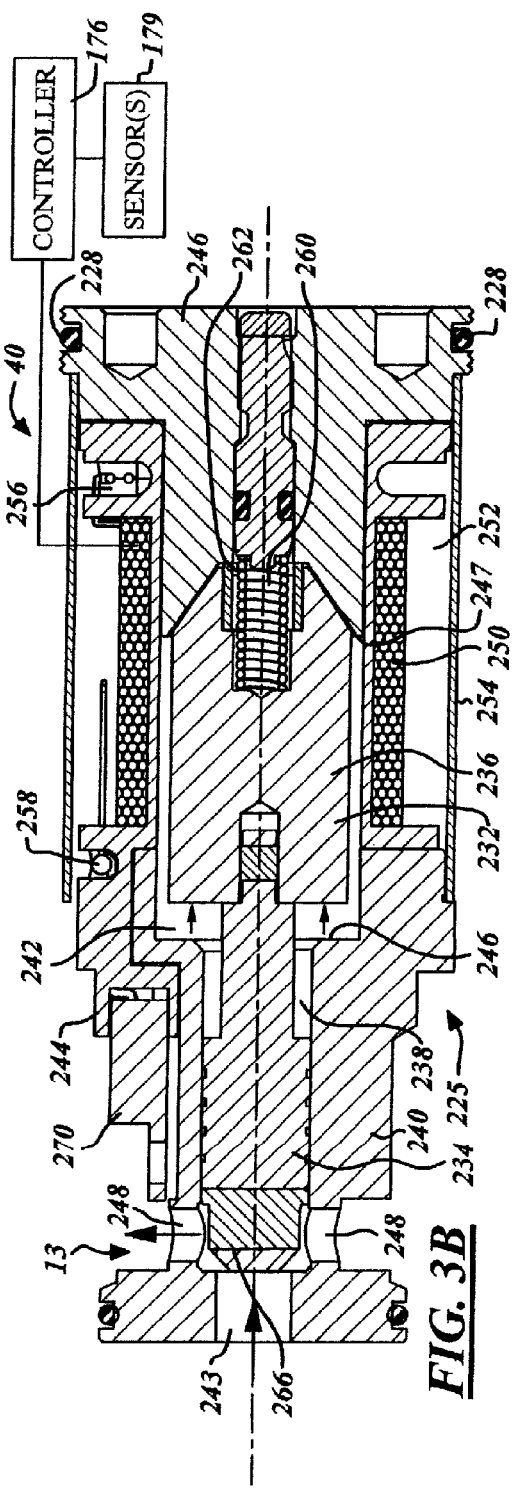

MECHANICAL SLIP FAILSAFE SYSTEM FOR A HEAVY DUTY MULTI-SPEED FAN CLUTCH

TECHNICAL FIELD

This invention relates to multi-speed fan clutch systems such as those used in automotive systems. More particularly, this invention relates to a mechanical slip failsafe system for a heavy-duty multi-speed fan clutch.

BACKGROUND ART

Fluid coupling devices ("fan drives") of the viscous shear type have been popular for many years for driving engine cooling fans, primarily because their use results in substantial saving of engine horsepower. The typical fluid coupling device operates in an engaged and relatively high speed condition only when cooling is needed. Further, it operates in a disengaged, relatively lower speed condition when little or no cooling is required.

Currently, viscous fluid fan clutches or fan drives are used in automotive engine cooling assemblies; and additional applications are constantly being developed. Fan speed of the fan clutches can be controlled for more efficient vehicle operation and better cooling through control of internal fan clutch torque transfer.

Viscous fluid fan clutches generally include power input members and power output members. The power input member of the clutch is driven by an engine or by an auxiliary power source. The power output member drives the fan to draw cooling air through heat exchange elements of a radiator, oil cooler, and air conditioner condenser. These clutches use a viscous fluid for transferring torque from the power input member to the output member. In the operation of these devices, the power input member often rotates at a higher speed than the output member. The difference in their speeds is called slip or slippage. Slip represents a power loss in the fan drive clutch and ways are constantly being sought for providing failsafe systems for slip situations occurring during extreme operation condition heat.

Viscous drives are always slipping to some degree causing them to be incapable of turning at fully engaged peak operating speeds or at higher speeds than originally designed. Since viscous drives are continuously slipping, they are continuously generating heat, unlike friction clutch assemblies. Viscous drives are further limited in that the more engine cooling needed the larger and more costly the viscous drive and cooling fan that is required. Thus, for increased engine cooling requirements viscous drives can become impractical in size and cost.

Due to increased engine cooling requirements, a current desire exists for a fan drive system capable of not only providing an increased amount of cooling over traditional fan drive systems but also having the associated advantages of a viscous drive, as stated above, without the associated disadvantages. It is also desirable that the fan drive system be practical and reasonable in size and cost so as to be approximately similar to, and preferably not to exceed that of, traditional fan drive systems. The present invention is directed to these ends.

SUMMARY OF THE INVENTION

A failsafe system for a heavy-duty multi-speed fan clutch includes a thermal valve coupled within a clutch pressure tube orifice circuit protecting a clutch pack from heat degradation. When oil temperature of the clutch reaches a level where thermal degradation can occur, the thermal valve allows flow into a clutch piston system at a maximum operating pressure, thereby engaging a clutch drive and cooling the clutch to a safe condition. The thermal valve can be a thermal switch or a sensor.

Although the present invention may be used advantageously in fluid coupling devices having various configurations and applications, it is especially advantageous in a coupling device of the type used to drive a radiator cooling fan of an internal combustion engine, and will be described in connection therewith.

Other features, benefits and advantages of the present invention will become apparent from the following description of the invention, when viewed in accordance with the attached drawings and appended claims.

BRIEF DESCRIPTION OF THE DRAWINGS

For a more complete understanding of this invention reference should now be had to the embodiments illustrated in greater detail in the accompanying figures and described below by way of examples of the invention wherein:

FIG. 3A is a cross-sectional view of a portion of the hydraulically controlled system utilizing a pressure relief valve in a closed position in accordance with a preferred embodiment of the present invention;

FIG. 3B is a cross-sectional view of a portion of the hydraulically controlled system utilizing a pressure relief valve in an open position in accordance with a preferred embodiment of the present invention.

BEST MODE(S) FOR CARRYING OUT THE INVENTION

Figure 1:
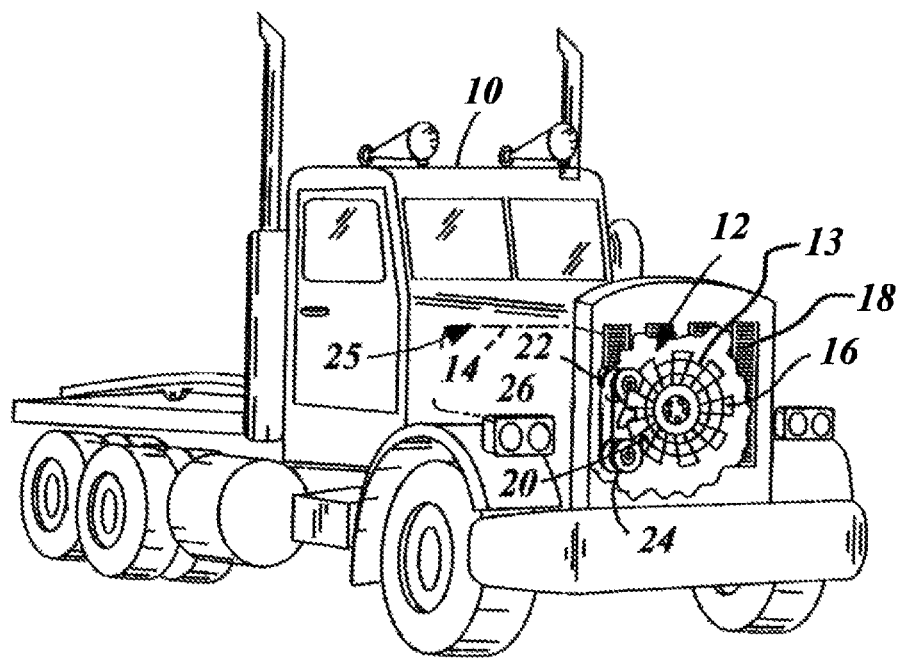
FIG. 1 is a perspective view of a vehicle utilizing a hydraulically controlled fan drive system in accordance with an embodiment of the present invention.

In the following figures the same reference numerals will be used to refer to the same components. While the present invention is described with respect to a method and system for a fan clutch failsafe system 13, the present invention may be adapted and applied to various systems including: vehicle systems, cooling systems, fan drive systems, friction drive systems, or other systems.

In the following description, various operating parameters and components are described for one constructed embodiment. These specific parameters and components are included as examples and are not meant to be limiting.

Also, in the following description various fan drive components and assemblies are described as an illustrative example. The fan drive components and assemblies may be modified depending upon the application.

Referring now to FIG. 1, a perspective view of a vehicle 10 utilizing a fan clutch system 12 having a fan clutch failsafe system 13 (illustrated further in FIGS. 2, 3A, and 3B) in accordance with an embodiment of the present invention is shown. The system 12 uses rotational energy from a liquid cooled engine 14 at an increased ratio turning a radiator cooling fan 16 for providing airflow through a radiator 18. The system 12 includes a housing assembly 20 fixed to a pulley 22, which is coupled to and rotates relative to a crankshaft (not shown) of the engine 14, via a pair of belts 24, within an engine compartment 25. Of course, the present invention may be relatively operative in relation to various components and via any number of belts or other coupling devices, such as a timing chain.

The housing assembly 20 is mounted on the engine 14 via a mounting bracket 26. The housing assembly 20 hydraulically engages the fan 16 during desired cooling intervals to reduce temperature of the engine 14 or to perform other tasks further discussed below. The fan clutch failsafe system 13 is included in the fan clutch system 12 for further preventing thermal degradation of system components.

The fan 16 may be attached to the housing assembly 20 by any suitable means, such as is generally well known in the art. It should be understood, however, that the use of the present invention is not limited to any particular configuration of the system 12, or fan mounting arrangement, or any particular application for the system 12, except as is specifically noted hereinafter.

Figure 2:
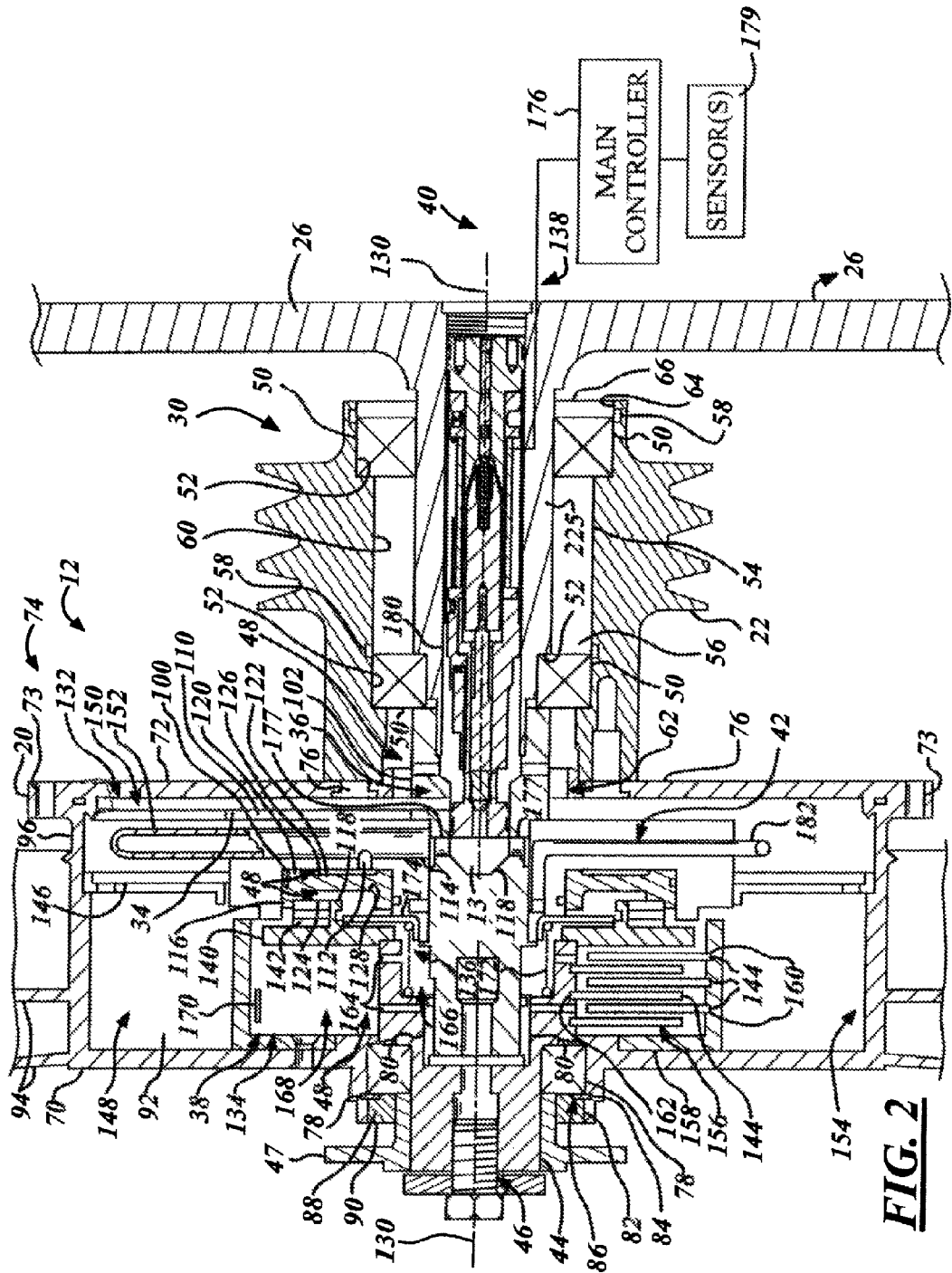
FIG. 2 is a cross-sectional view of the hydraulically controlled system in accordance with an embodiment of the present invention.
Figure 3C:
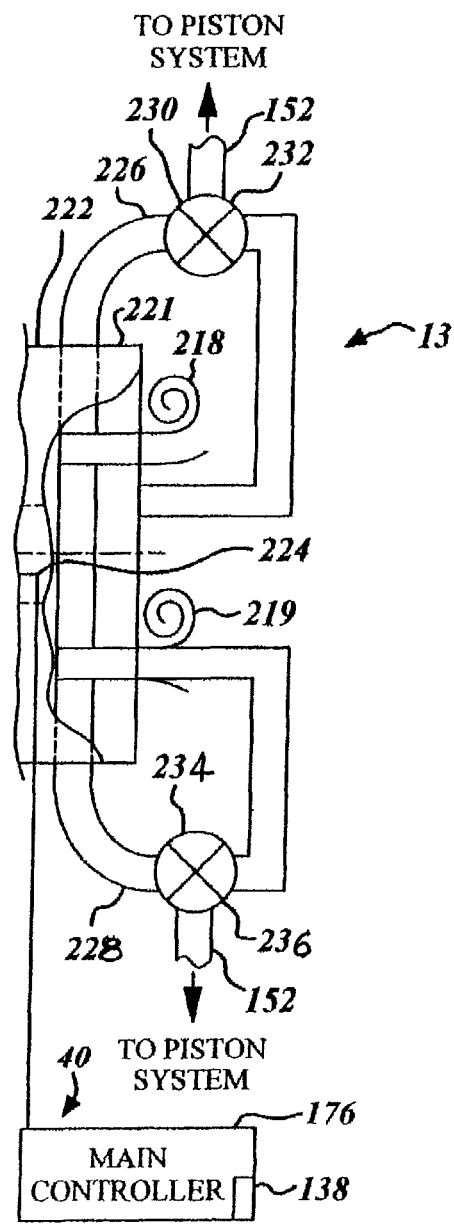
FIG. 3C schematically discloses an embodiment of the invention.

Referring now to FIGS. 2, 3A, and 3B, a first portion and a second portion of a cross-sectional view of the system 12 in accordance with an embodiment of the present invention are shown. The system 12 includes the fan clutch failsafe system 13, an input circuit 30, the housing assembly 20, a piston assembly 34, an engaging circuit 36 having a mechanical portion 38, an electrical portion 40, and a variable cooling and lubrication circuit 42.

The failsafe system 13 for the heavy-duty multi-speed clutch 12 includes a pair of thermal valves 218, 219 coupled within a clutch pressure tube orifice system 221 coupled to a clutch pressure tube 152 protecting a clutch pack 156 from heat degradation. When oil temperature of the clutch 12 reaches a level where thermal degradation can occur, the thermal valve 218 allows flow into a clutch piston area or piston system 116 at a maximum operating pressure, thereby engaging a clutch drive of a clutch plate assembly 134 and cooling the clutch 16 to a safe condition.

The pressure tube orifice system 221 includes a housing 222 defining an inlet 224 leading into a first valve line 226 and a second valve line 228. In other words, the pressure tube orifice system 152 is coupled to a bracket assembly 26 and includes a flow junction (housing 222, inlet 224, first valve line 226, second valve line 228) receiving the oil flow from the bracket assembly 26.

The first valve line 226 defines a first solenoid valve controlled orifice 230 receiving an oil flow from the inlet 224. The first orifice 230 is controlled by a first solenoid valve 232, which may be controlled by a fluid controller 118 including control logic therefor.

The second valve line 228 defines a second solenoid valve controlled orifice 234 (second orifice) receiving the oil flow from the flow junction. The second orifice 234 is controlled by a second solenoid valve 236, which also may be controlled by the fluid controller 118.

The piston system 116 includes the clutch drive engaged in response to an increase in oil flow pressure into the piston system 116 from at least one of the first valve line 226 or the second valve line 228.

The first thermal valve 218 (bimetal coil valve) is coupled within the housing 222 between the inlet 224 and the first solenoid controlled orifice 230 such that the first thermal valve 218 fully closes in response to thermal temperature exceeding a predetermined amount, thereby changing the oil flow pressure into the piston system 116. The first thermal valve 218 allows the oil flow to the first orifice when cold and blocks the flow by fully engaging when hot. The first thermal valve 218 remains fully engaged until the thermal temperature thereof drops below the predetermined amount.

As with the first thermal valve, the second thermal valve 219 (bi-metal coil valve) is coupled within the housing 222 between the inlet 224 and the second solenoid controlled orifice 234 such that the second thermal valve 219 fully closes in response to thermal temperature exceeding a predetermined amount, thereby changing the oil flow pressure into the piston system 116. The second thermal valve 219 allows the oil flow to the second orifice 234 when cold and blocks the flow by fully engaging when hot. The second thermal valve 218 remains fully engaged until the thermal temperature thereof drops below the predetermined amount.

The input circuit 30 provides rotational energy to the housing assembly 20. The engaging circuit 36 engages the housing assembly 20 to a fan shaft 44, via the piston assembly 34, to rotate the fan 16. The fan 16 may be coupled to the fan shaft 44 via splines 46, threaded into the fan shaft 44, or by other techniques known in the art, such as coupling to the fan hub 47. The fan shaft 44 may be a single unit, as shown, or may be split into a fan shaft portion and a clutch shaft portion. The variable cooling circuit 42 provides distribution of hydraulic fluid 48 throughout and in turn cooling and lubricating components within the housing assembly 20. The hydraulic fluid may be an oil-based fluid or similar fluid known in the art.

The input circuit 30 includes the pulley 22 that rotates about the mounting bracket 26 on a set of pulley bearings 50. The pulley bearings 50 are held between pulley bearing notches 52, in a stepped inner channel 54 of the pulley 22, and pulley bearing retaining rings 56, that expand into pulley ring slots 58 in an interior wall 60 of the pulley 22. The pulley 22 may be of various types and styles, as known in the art. The inner channel 54 corresponds with a first center opening 62 in the housing assembly 20. The hydraulic fluid 48 flows through the center opening 62 into the inner channel 54 and cools and lubricates the bearings 50. A first seal 64 resides in the inner channel 54 on an engine side 66 of the pulley 22 for retaining the hydraulic fluid 48 within the housing assembly 20.

The housing assembly 20 includes a die cast body member 70, and a die cast cover member 72, that may be secured together by bolts (not shown) through channels 73 of the outer periphery 74 of the die cast member 70 and cover member 72. The die cast member 70 and the cover member 72 may be secured together using other methods known in the art. It should be understood that the present invention is not limited to use with a cast cover member, but may also be used with other members such as a stamped cover member. The housing assembly 20 is fastened to the pulley 22, via fasteners (not shown) extending through the cover member 20 into the pulley 22 in designated fastener holes 76. The housing assembly 20 rotates in direct relation with the pulley 22 and rides on a housing bearing 78 that exists between the housing assembly 20 and the fan shaft 44. The housing bearing 78 is held within the housing assembly 20 between a corresponding housing bearing notch 80 in the body member 70 and a housing bearing retainer ring 82 that expands into a housing ring slot 84.

A second center opening 86 exists in the body member 70 for allowing the hydraulic fluid 48 to circulate, cool, and lubricate the housing bearings 78. A second seal 88 resides on a fan side 90 of the housing assembly 20 for retaining the hydraulic fluid 48 within the housing assembly 20.

The body member 70 has a fluid reservoir 92 containing the hydraulic fluid 48. Cooling fins 94 are coupled to an exterior side 96 of the body member 70 and perform as a heat exchanger by removing heat from the hydraulic fluid 48 and releasing it within the engine compartment 25. The cover member 72 may be fastened to the body member 70 using various methods known in the art. For further explanation of the housing assembly 20 see U.S. patent application Ser. No. 09/711,735, entitled "Molded Cooling Fan", which is incorporated by reference herein. Note, although the fan 16 is shown as being attached to the body member 70 it may be coupled to the cover member 72.

The piston assembly 34 includes a piston housing 100 rigidly coupled to a distribution block 102, which is rigidly coupled to the bracket 26 on a first end 104. The distribution block 102 is coupled to a fan shaft bearing 106 on a second end 108, which allows rotation of the fan shaft 44 about the second end 108. The piston housing 100 has a main pitot tube channel 110, having a piston branch 112 and a controller branch 114 for flow of the hydraulic fluid 48 to a translating piston 116 and to a hydraulic fluid controller 118 respectively. The piston 116 is coupled within a toroidally shaped channel 120 of the housing 100 and has a pressure side 122 and a drive side 124, with a respective pressure pocket 126 and drive pocket 128. The piston translates along a center axis 130 to engage the housing assembly 20 to the fan shaft 44, via hydraulic fluid pressure from the piston branch 112.

The engaging circuit 36 includes a hydraulic fluid supply circuit 132, a clutch plate assembly 134, a return assembly 136, and a control circuit 138. The hydraulic circuit 132 applies pressure on the piston 116 to drive an end plate 140, riding on a separation bearing 142 between the endplate 140 and the piston 116, against clutch plates 144 within the clutch plate assembly 134 and engages the fan 16. The control circuit 138 controls operation of the piston 116 and engagement of the fan 16. Of course, any number of clutch plates may be used. Also, although a series of clutch plates are utilized to engage the fan 16 other engagement techniques known in the art may be utilized.

The hydraulic circuit 132 may include a baffle 146 separating a relatively hot cavity side 148 from a relatively cool cavity side 150 of the fluid reservoir 92 and a pressure pitot tube 152. The pressure tube 152 although shown as being tubular in shape may be of various sizes and shapes. The pressure tube 152 receives hydraulic fluid 48 from within the cool side 150, providing cooling to the engaging circuit 36, due to flow of the fluid 48 from rotation of the housing assembly 20, carrying the fluid 48 in a radial pattern around an inner periphery 154 of the housing assembly 20. The pressure tube 152 is rigidly coupled within the main channel 110 and is therefore stationary. As fluid 48 is circulating about the inner periphery 154, a portion of the fluid 48 enters the pressure tube 152 and applies pressure on the pressure side 122 of the piston 116. Differential speed generated by the fluid 48 through the pressure tube 152 can be expressed according to Bernoulli's equation, shown as equation 1.

$$P_v = \frac{\rho V^2}{2g} \quad [1]$$

In using equation 1, resulting velocity V on the clutch plate assembly 134 is represented in terms of velocity pressure P, density ρ, and gravity g. Thus, as the rotational speed of the housing assembly 20 increases pressure applied on the clutch assembly 134 also increases providing variable drive speed of the fan 16, as further discussed below. Pressure P within the pressure tube 152 varies proportional with square of velocity V, and since torque of the fan 16 also varies with square of the velocity V, the fan 16 rotates at an approximately proportional constant percentage of input speed or velocity V.

Since the fan 16 has a variable drive speed due to proportional pressure within the pressure tube 152, at low engine speeds, such as during an idle condition, the fan 16 is rotating at a low speed. When the engine 14 is power OFF, there is minimum torque existing in the fan 16, which may be absorbed by the belts 24, unlike that of prior art systems. In a conventional fan clutch system when a fan is rotating or engaged, the fan is typically rotating at a high speed. When an engine is power OFF, torque existing in the conventional fan and fan clutch system is transferred into engine belts, degrading and damaging the belts. Some conventional systems incorporate electronic control devices, such that when an ignition system is powered OFF, the fan clutch system is disengaged before the engine is powered OFF. The additional electronic control devices add complexity and costs. Also, it is generally undesirable to allow an engine to continue running for a time period after an ignition is powered OFF. The present invention eliminates the need for the additional electronic devices and the initial disengagement of a fan clutch system, due to its proportional fan rotating speed design as stated above.

The clutch plate assembly 134 includes a clutch pack 156 within a drum housing 158. The clutch pack 156 includes the multiple clutch plates 144 separated into a first series 160 coupled to the drum housing 158 and a second series 162 coupled to the fan shaft 44. The piston 116 drives the endplate 140 to apply pressure on the clutch plates 144, which engages the fan 16. The fan shaft 44 has multiple cooling passageways 164 that extend between a fan shaft chamber 166 and an inner drum chamber 168 allowing passage of fluid 48 therein. Fluid 48 after entering the drum chamber 168 passes across and directly cools the plates 144 and returns to the fluid reservoir 92 through slots 170 in the drum housing 158. The slots 170 may be of various size and shape and have various orientations relative to the center axis 130. The cooling passageways 164 although shown as extending perpendicular to the center axis 130 may extend parallel to the center axis 130, similar to the slots 170.

The return assembly 136 includes a set of return springs 172 and a spring retainer 174. The springs 172 reside in the fan shaft chamber 166 and are coupled between the fan shaft 44 and the spring retainer 174. The spring retainer 174 has a quarter cross-section that is "L" in shape and is coupled between the drive side 124 and the end plate 140. The springs 172 are in compression and exert force on the piston 116 so as to disengage the clutch plates 144 when fluid pressure on the pressure side 122 is below a predetermined level.

The control circuit 138 includes the distribution block 102, the fluid controller 118, and a main controller 176. The distribution block 102 may have various configurations depending upon the type and style of the fluid controller 118, only one is shown. The distribution block 102 contains a return channel 177 coupled to the controller branch 114. The fluid controller 118 may be coupled within a main center channel 178 of the block 102, adjust fluid flow through the return channel 177, may be coupled within the bracket 26, or be external to the block 102 and bracket 26. When the fluid controller 118 is coupled within the bracket 26 or external therefrom, tubes (not shown) may couple and extend from the controller branch 114 to the fluid controller 118 through the main center channel 178 and possibly through a center portion 180 of the bracket 26, when externally coupled. As shown, the fluid controller 118 adjusts fluid flow through the controller branch 114 across the main center channel 178, via the return channel 177, whereafter the fluid returns to the reservoir 92. In adjusting fluid flow through the controller branch 114, the fluid controller 118 adjusts pressure received by the piston 116. As the fluid controller 118 decreases fluid flow through the controller branch 114, pressure in the piston branch 112 and on the piston 116 increases.

The fluid controller 118 may adjust fluid pressure electronically, mechanically, or by a combination thereof. The fluid controller 118 although shown as an electronically controlled proportioning valve, may be of various type and style known in the art. The fluid controller 118 may be in the form of a solenoid, a bimetal coil device, a valve, or in some other form of fluid controller. The fluid controller 118 may have internal logic or reactive mechanisms to determine when to alter fluid flow or may be coupled to a separate controller, as shown, for such determination. The fluid controller 118 when not receiving a power signal or in a default mode, is preferably in a closed state to increase pressure on the piston 116 and engage the clutch plates 144. Therefore, when the engine 14 is in operation the fluid controller 118 defaults to a closed state to provide cooling even when the controller 118 is inoperative. By having a default state of closed, diagnostic testing of the system 12 is easily accomplished by simply preventing the fluid controller 118 from receiving the power signal, which may be accomplished by electrically unplugging the controller 118 or through use of a diagnostic tool or controller (not shown).

The main controller 176 is electrically coupled to various engine operating sensors 179 and may be contained within the system 12 or may be separate from the system 12 as shown. The main controller 176 is preferably microprocessor based such as a computer having a central processing unit, memory (RAM and/or ROM), and associated input and output buses. The main controller 176 may be a portion of a central vehicle main control unit, an interactive vehicle dynamics module, a cooling system controller, or may be a stand-alone controller as shown. The main controller 176 generates a cooling signal, in the form of a pulse width modulated (PWM) current or analog current, containing information such as when cooling is desired and the amount of cooling that is desired.

When current is passed through the coil 250 from the controller 176, a magnetic flux is created that extends through the armature 236, air gap 247, pole piece 246 flux tube 254, and valve body 240. The magnetic flux created urges the armature assembly 232 to move axially towards the spring 260, the amount of movement dependent upon the size of the magnetic flux created. The movement rightward of the valve 234, as shown in FIG. 3B, unseals the vents 248, also known as the open position, therein allowing fluid 48 to escape from the pitot tube 152, through a tubular region 243, and out the vents 248 to the hydraulic circuit 132, where the hydraulic fluid 48 then returns to the fluid reservoir 92. This decreases the fluid pressure within the pitot tube 152. The decreased fluid pressure in the pitot tube 152, as a result of the venting, allows the piston 116 to move away from the clutch pack 156, therein disengaging the plates 144 and decreasing the fan 16 rotational speed.

Of course, while FIG. 3B shows the armature assembly in a fully open position, any number of intermediate partially open positions may be achieved, depending upon the strength of the electrical current sent to the coil. Thus, a partially opened position, wherein the valve 234 partially unseals the vents, allows the fluid pressure to be more precisely controlled.

The PWM system design requires control of the duty cycle to control the average "open" time of the relief valve assembly 225. The inherent accumulator effect of the fan drive allows pressure to build when the valve assembly 225 is closed, and fall when the valve assembly 225 is open. The cyclic fluid pressure is averaged on the piston 116 and clutch pack 156 and results in a controlled torque to the output shaft.

The analog system design works in substantially the same manner as the PWM design, but does not "average" the cyclic fluid pressure. Instead, the solenoid design offers a given flow rate for a given current electrical signal. In this design, some type of valve position feedback to an embedded controller or main controller 176 is required.

Also shown in FIGS. 2, 3A and 3B is an internal temperature protection device 270 in accordance with another embodiment of the present invention. The device 270 is positioned within the cavity created by the vents 248 and within the flux tube 254. The device is electrically coupled to the bi-directional diode pack 256 and resistor 258, which are also electrically coupled in series to the coil 250 and main controller 176.

The device 270 is temperature sensitive in that when temperature of the hydraulic fluid 48 exceeds a predetermined temperature level, the device 270 prevents currents from flowing from the main controller 176 to the coil 250. This maintains the assembly 225 in the closed position, allowing a majority of the fluid within the pressure tube 152 to be directed through the piston branch and fully engage the plates 144. By fully engaging the plates 144 there is no slip present between the plates 144 and temperature of the plates 14 as well as the fluid 48 and the system 12 decreases.

As mentioned above, the relief valve assembly 225 also utilizes a separate fail-safe mechanism deigned to prevent damage to the fan assembly during use. As the fluid pressure in the pitot tube 152 builds during normal operation, it exerts pressure on the end 266 of the valve 232 through the tubular region 243. At a certain threshold pressure, the fluid pressure is sufficient to overcome the spring 260 to force the valve 232 axially towards the spring 260 to the open position, therein allowing a portion of the fluid 48 within the pitot tube 152 to escape through the tubular region 243 and vents 244 and return to the fluid reservoir 92. The valve assembly 225 remains in the open position until such time as the fluid pressure within the pitot tube 152 is a level at or below the predetermined threshold pressure. This axial movement may therefore occur even in the absence of electrical activation of the coil 250.

Of course, as one skilled in the art recognizes, the threshold pressure is depended upon the strength of spring 260 urging the valve 232 to cover the vents 248. A stronger spring 260 will require higher fluid pressure to expose the vents 248. Thus, systems requiring a lower threshold pressure venting would utilize a weaker spring. By controlling the size and strength of the spring 260, the relief valve assembly 225 may thus be set to open at any predetermined threshold pressure corresponding to any fan speed to prevent damage to the system 12 at high fan speeds.

The present invention provides a fan drive system with increased internal cooling capacity over prior art fan drive systems. The present invention incorporates the advantages of both a friction clutch assembly and of a viscous drive including ability to cycle repeat, engage at higher engine rpm speeds, having varying degrees of engagement, and being able to be fully engaged or fully disengaged. By having variable fan operating speeds the present invention increases vehicle fuel economy, provides more consistent engine cooling, and reduces the amount of time that a radiator cooling fan is operating in a fully engaged mode.

Additionally, the present invention through use of pitot tubes, provides an inexpensive engagement circuit and cooling and lubrication circuit entirely inclusive in a single housing assembly. The present invention also provides failsafe capability in that it is capable of defaulting to an engaged state or fan operative state when the main controller is inoperative.

Furthermore, the present invention minimizes fan drive system operating noise by being capable of hydraulically engaging a radiator cooling fan at multiple selected or predetermined slower partially engaged speeds rather than at a fully engaged speed, when a fully engaged speed is not required.

Also, the present invention provides precise electronic control, via an analog or pulse width modulated actuation, for controlling the fluid pressure within the pitot tube used to engage the fan.

The present invention also provides an additional failsafe method by limiting the fluid pressure in the pitot tube to a maximum threshold fluid pressure during any type of operation to aid in protecting the fan, and most importantly the cover/housing structure, from damage due to fluid pressure buildup.

While the invention has been described in connection with one embodiment, it will be understood that the invention is not limited to that embodiment. On the contrary, the invention covers all alternatives, modifications, and equivalents as may be included within the spirit and scope of the appended claims.

What is claimed is:

1. A control system for a hydraulically controlled fan clutch system, said control system comprising:
   (a) a base mounting member;
   (b) a housing assembly rotatably connected to said base mounting member and containing a fluid, said housing assembly connected to a pulley member for rotating at input speed;
   (c) an output member rotatably positioned relative to said housing assembly;
   (d) a cooling fan member attached to said output member;
   (e) a wet clutch pack in said housing assembly, said wet clutch pack positioned between said housing assembly and said output member and dependent upon pressure of the fluid for selectively rotating said output member and said fan member;
   (f) an axial extending valve assembly positioned in said base mounting member for controlling the amount of fluid being transmitted to said wet clutch pack;
   (g) a controller with an electric coil for electronically controlling the flow of fluid into said valve assembly; said controller operable to control the flow of fluid by the amount of magnetic flux created by said electric coil;
   (h) a temperature control mechanism in said valve assembly for selectively preventing flow of fluid through said valve assembly when the temperature of said fluid exceeds a predetermined temperature level; and
   (j) a fluid pressure relief mechanism operable to allow escape of at least a portion of said fluid at a predetermined fluid pressure level.

2. The control system as described in claim 1 wherein said temperature control mechanism comprises a thermal switch.

3. The control system as described in claim 1 wherein said temperature control mechanism comprises a thermal sensor.

4. The control system as described in claim 1 wherein said predetermined temperature level is the temperature at which said fluid will thermally degrade.

5. The control system as described in claim 1 wherein said fluid pressure relief mechanism comprises a pressure relief valve for limiting the pressure of fluid in said clutch pack.

6. The control system as described in claim 1 wherein said valve assembly is spring biased to a closed position, whereby transmission of fluid to said clutch pack is prevented.

7. The control system as described in claim 1 wherein said valve assembly has a first position which allows full flow of fluid to said clutch pack, a second position which prevents flow of fluid to said clutch pack and an infinite variety of third positions allowing partial flow of fluid to said clutch pack.

* * * * *